United States Patent [19]

Kanare et al.

[11] Patent Number: 5,056,131

[45] Date of Patent: Oct. 8, 1991

[54] TELEPHONE LINE MONITORING CIRCUITRY AND APPARATUS

[75] Inventors: Edward Kanare, 4143 Via Marina, No. 1019, Santa Monica, Calif. 90292; Kenneth Rehler, Santa Monica, both of Calif.

[73] Assignee: Edward Kanare, Marina Del Rey, Calif.

[21] Appl. No.: 606,060

[22] Filed: Oct. 29, 1990

[51] Int. Cl.[5] .................... H04M 1/24; H04M 3/24
[52] U.S. Cl. .................................. 379/33; 379/27
[58] Field of Search ................... 379/22, 33, 32, 27

[56] References Cited

U.S. PATENT DOCUMENTS

| | | |
|---|---|---|
| 3,951,248 | 4/1976 | Feiner . |
| 3,976,849 | 8/1976 | Champan . |
| 4,002,861 | 1/1977 | Putt . |
| 4,373,120 | 2/1983 | McDonald . |
| 4,513,176 | 4/1985 | Fostveit . |
| 4,544,807 | 10/1985 | Sers . |
| 4,564,728 | 1/1986 | Romano . |
| 4,588,862 | 5/1986 | Grabowy . |
| 4,600,810 | 7/1986 | Feldman . |
| 4,827,498 | 5/1989 | Ross ..................................... 379/27 |
| 4,841,559 | 6/1989 | Curtis .................................. 379/27 |
| 4,969,178 | 11/1990 | Chen et al. ........................ 379/33 |
| 4,969,179 | 11/1990 | Kanare et al. ..................... 379/33 |

FOREIGN PATENT DOCUMENTS 1133603  12/1982  Canada .................................. 379/33

*Primary Examiner*—Stafford D. Schreyer
*Attorney, Agent, or Firm*—Thomas I. Rozsa

[57] ABSTRACT

A telephone line monitoring circuitry apparatus which is used to continuously monitor the telephone line and causes a light emitting diode to flash on and off and further causes an auditory sounder to sound loud and soft to provide both a visual signal and an auitory signal if the telephone line becomes inoperative. The light emitting diode is a self-flashing type which serves to modulate the auditory sounder. The monitoring circuitry and apparatus is energized by a DC battery, or by an AC power source with DC battery back-up. The monitoring circuitry and apparatus is designed to have acceptable input impedance and ringer-equivalence and complete isolation to prevent interference with the telephone network.

44 Claims, 2 Drawing Sheets

TELEPHONE LINE MONITORING CIRCUITRY AND APPARATUS

BACKGROUND OF THE INVENTION

1. Field of the Invention

The present invention relates to the field of consumer used by the consumer to monitor a telephone line to be certain that the telephone line is operative. A telephone line is inoperative when it is either broken, out, shorted or unplugged. Oftentimes, an individual who may be waiting for an important incoming telephone call has no idea that the telephone line has become inoperative. Unless the individual tries to make a call and discovers that the telephone line is inoperative, there is no way for the individual to know of this.

The present invention relates to the field of monitoring and signalling circuitry and apparatus which can detect telephone line failure and further provide both visual and auditory warning signals to alert a user when the telephone line becomes inoperative.

2. Description of Prior Art

A co-pending patent application "Telephone Line Monitoring Circuit For Providing A Visual and Auditory Signal If the Telephone Line Becomes Inoperative" (Ser. No. 07/462,218) was filed on Jan. 9, 1990.

In general, line monitoring devices have been produced in the prior art. The following patents are representative of known telephone line monitoring devices:

1. U.S. Pat. No. 4,841,559 issued to Curtis on June 20, 1989 for "Telephone Network Interface Tester".
2. U.S. Pat. No. 4,513,176 issued to Fostveit on Apr. 23, 1985 for "Test Apparatus For Telephone Equipment".
3. U.S. Pat. No. 4,827,498 issued to Ross on May 2, 1989 for "Telephone Line And Instrument Tester".
4. U.S. Pat. No. 3,976,849 issued to Champan on Aug. 24, 1976 for "Telephone Wiring Tester".
5. U.S. Pat. No. 4,544,807 issued to Sers on Oct. 1, 1985 for "Fault Detector Test Instrument".
6. U.S. Pat. No. 3,951,248 issued to Feiner et al on Apr. 20, 1976 for "Telephone Line Visual Status Indication Circuit".
7. U.S. Pat. No. 4,002,861 issued to Putt on Jan. 11, 1977 for "Protector Module Test Set".
8. U.S. Pat. No. 4,373,120 issued to McDonald on Feb. 8, 1983 for "Line Test Termination Device".
9. U.S. Pat. No. 4,564,728 issued to Romano on Jan. 14, 1986 for "Apparatus For Testing A Telephone Line".
10. U.S. Pat. No. 4,588,862 issued to Grabowy on May 13, 1986 for "Visual Display Network Interface".
11. U.S. Pat. No. 4,600,810 issued to Feldman et al on Jul. 15, 1986 for "Telephone Line Tester".

U.S. Pat. No. 4,827,498 issued to Ross relates to a telephone line tester which has a standard modular plug that can plug into a standard telephone line. The circuit of the tester is responsive to the flow of current therethrough for providing an indication of the operation of the source related equipment and/or the telephone instrument. The device is not a continuous monitoring device and requires that the user unplug the telephone and insert this plug into the line in place of the telephone line and then do the testing.

U.S. Pat. No. 3,976,849 issued to Champan illustrates a telephone wiring tester designed to receive modular terminal plug 17 and to test line voltage. This device also is not a continuous monitoring device and is a test device which is used when the telephone is unplugged. The device is used to test and check for the presence of a minimum voltage of the correct polarity between the tip and ring line conductors of a telephone installation and also to check for the presence of a proper AC lamp voltage between the ground and the lamp lead on a modular jack type telephone installation.

U.S. Pat. No. 4,544,807 issued to Sers discloses a fault detector test instrument for detecting faults on telephone lines. The device provides an indication of the most common wiring faults such as grounds, foreign E.M.F., resistance across the lines, open circuits, etc.

U.S. Pat. No. 4,513,176 to Fostveit shows a test apparatus for telephone equipment. The device discloses a multiplicity of test circuits that the owner can use to test for a problem in the line.

U.S. Pat. No. 4,841,559 to Curtis discloses another telephone test line type device.

U.S. Pat. No. 3,951,248 to Feiner discloses a telephone visual indicating circuit to enable an installer to determine without actually physically going off the hook what the status of a telephone line is.

U.S. Pat. No. 4,002,861 issued to Putt discloses a modular plug-in telephone test set in a carrying case.

U.S. Pat. No. 4,373,120 to McDonald discloses a line test device used by the telephone company to test the telephone line. It provides a characteristic signature recognizable by the telephone central office when a continuity test is made on the subscriber line.

U.S. Pat. No. 4,564,728 to Romano discloses another embodiment of a telephone line tester. This tester is a simple device which uses a bipolar LED comprised of two parallel light emitting diodes which are arranged between terminals 15 and 16 in opposite polarity. The telephone line tester comprised of this bipolar LED has coupled thereto two wires which terminate in a modular plug. The plug is inserted into the telephone jack and if the telephone line is operating properly, one of the diodes will illuminate depending upon the polarity of the lines.

U.S. Pat. No. 4,588,862 to Grabowy is a visual display network interface for placement between incoming telephone network access lines to a structure and the user telephone equipment within the structure.

U.S. Pat. No. 4,600,810 to Feldman is another telephone line tester which determines whether or not there is adequate power in the signal when plugged into the telephone jack.

Most of the prior art testing apparatus does not provide continuous monitoring of the line and is instead an intermittent test apparatus which requires disconnecting the telephone and then testing the line. Continuous monitoring is important for the average consumer who does not know when his or her line may go dead. In addition, for a blind person, a visual signal is not adequate to warn when the line has gone dead and a supplemental audible signal is required. In addition, the telephone in the household may only be in one room and the person may not be looking at the telephone for an extended period of time. Therefore, an audible signal to warn of line failure is also important under normal circumstances in case the telephone is not in easy view of the person. In addition, for a deaf person, an audible signal is not adequate to warn when the line has gone dead and a supplemental visual signal is required.

Co-pending patent application "Telephone Line Monitoring Circuit For Providing A Visual and Auditory Signal If the Telephone Line Becomes Inoperative" (Ser. No. 07/462,218) filed on Jan. 9, 1990 discloses a telephone line monitoring circuit which continuously detects a telephone line and will provide both visual and auditory signal when the telephone line is inoperative. In addition, the present invention discloses a telephone line monitoring circuitry and apparatus which uses a delay means to provide a delay of about ten seconds from the telephone line becoming inoperative to producing the alarm signals to prevent false alarms that may occur from brief and legitimate changes in the telephone line. It further discloses the use of an operational-amplifier means operated at micropower level to further conserve energy, and an optocoupler, an oscillator and a transformer to provide complete isolation of the circuitry to prevent interference with the telephone network. It additionally discloses the use of a secondary power source to further provide a DC back up power when the circuitry and apparatus is energized by an AC power source.

SUMMARY OF THE PRESENT INVENTION

The present invention is a telephone line monitoring circuitry and apparatus which is used to continuously monitor the telephone line and provide both a visual signal and an auditory signal if the telephone line becomes inoperative.

It is well known that the standard voltage between the ring and tip wires of a telephone line is about 50 volts when the telephone line is operative. When a local instrument such as a telephone is in use, the voltage drops to nominally 6 to 8 volts. When several phones are picked at the same extension, the voltage may further drop to about 4 to 6 volts. If the telephone line is broken, cut or shorted, or unplugged, then voltage is lost and the line becomes inoperative. Accordingly, if the number of the telephone is dialed, it will not ring.

It has been further discovered, according to the present invention, that if a monitoring circuitry and apparatus is connected into a telephone line, which monitoring circuitry and apparatus is capable of sensing the voltage of the telephone line and further provides an auditory and visual signal when the voltage drops below about 4 volts DC so as to make the telephone line inoperative, then the monitoring circuitry and apparatus can warn a user when the telephone line has become inoperative in this manner and thereby prevent needless waste of time and problems in waiting for a telephone call when the line is inoperative.

It has further been discovered, according to the present invention, that a continuous telephone line monitoring circuitry and apparatus provides a means wherein the user can be instantaneously forewarned if the telephone line becomes inoperative.

It has additionally been discovered, according to the present invention, that the inclusion of both a visual signal and an auditory signal in the monitoring circuitry and apparatus provides an assured warning system since a visual signal alone may not be sufficient in some situations such as when there is only one telephone which is located in only one room and the telephone is not always in easy viewing of the user.

It has further been discovered, according to the present invention, that the continuous monitoring circuitry and apparatus can also be used with other telephone line operating devices such as FAX machine or a computer modem to warn when the telephone line has become inoperative.

It is therefore an object of the present invention to provide a continuous monitoring circuitry and apparatus which continuously monitors the telephone line for a telephone line operating device such as a telephone or FAX machine, and which provides both a visual and auditory signal if a telephone line is broken, cut or shorted, or if the device is unplugged from the telephone line. The monitoring circuitry and apparatus is also designed to provide a warning signal if the line voltage drops below about 4 volts DC to thereby make the telephone ring system inoperative.

It is a further object of the present invention to provide a visual and auditory signal only if the telephone line is broken or cut or shorted or unplugged and to not be activated during normal use of the telephone. It is an object of the present invention to provide such a circuitry and apparatus which, while continuously monitoring a telephone line, will simultaneously permit ordinary use of the telephone line such as an answering machine responding to an incoming call, a person making a telephone call, a person answering the telephone after a ring, or if a computer answers or makes a call.

It is an even further object to provide complete isolation of the circuitry to prevent interference with the telephone network when the monitoring circuitry and apparatus is powered by AC voltage source.

It is an additional object of the present invention to provide a circuitry which uses less energy, and has large input impedance and ringer-equivalence acceptable to telephone companies.

It is a further additional objective of the present invention to provide a delay of about ten seconds from the telephone line becoming inoperative to producing the alarm signals to prevent false alarms that may occur from brief and legitimate changes in the telephone line.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the invention. Various changes and modifications obvious to one skilled in the art to which the invention pertains are deemed to be within the spirit, scope and contemplation of the invention as further defined in the appended claims.

Figure 1:
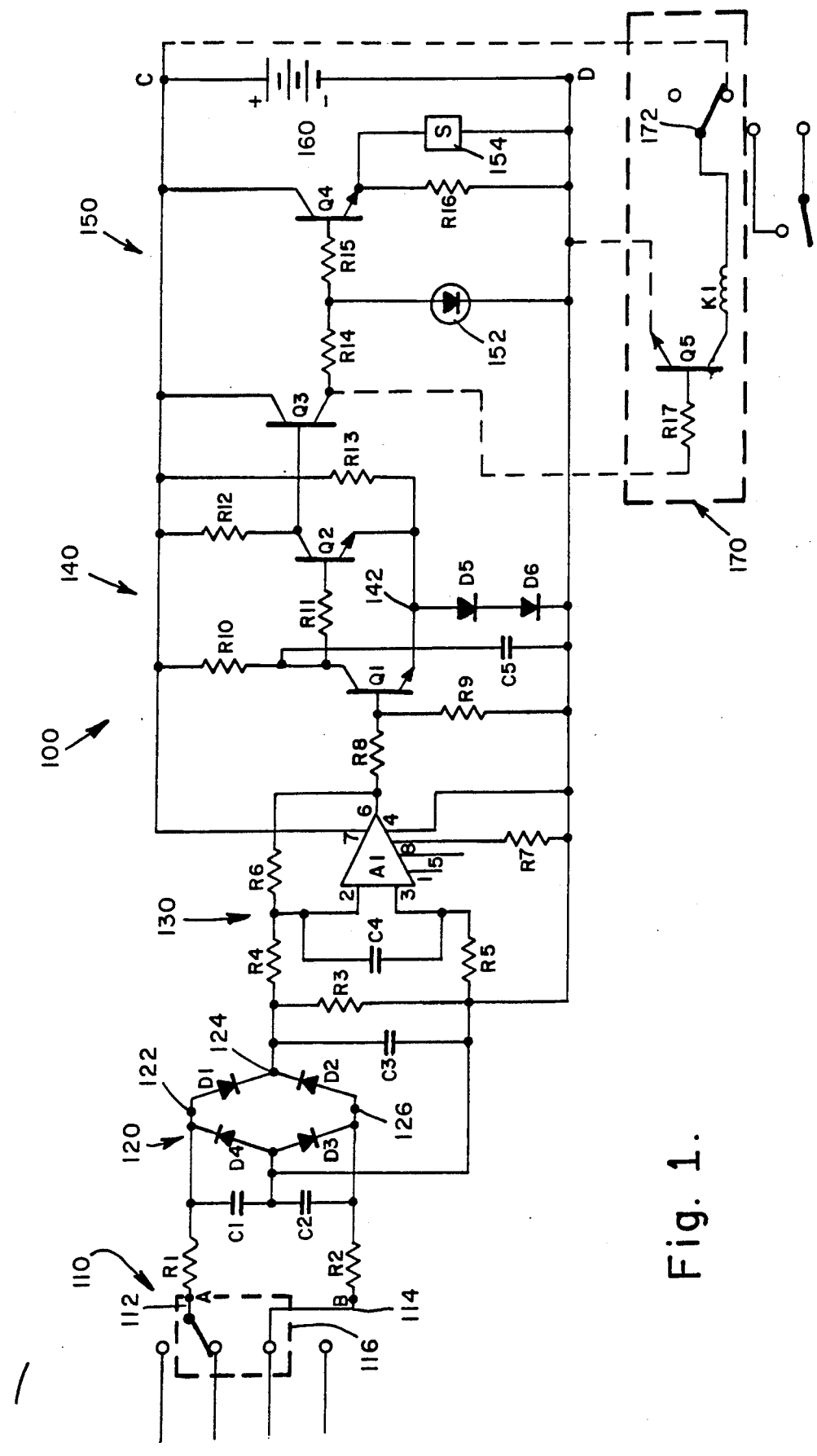
FIG. 1 shows at 100 the schematic diagram of the circuitry of a preferred embodiment of the present invention telephone monitoring circuitry and apparatus. Circuitry 100 comprises a circuit connector means 110, a first circuit means 120, a second circuit means 130, a third circuit means 140, a fourth circuit means 150 and a circuit power means 160. Circuitry 100 may further comprise an optional relay circuit 170.

Referring to FIG. 1, there is shown at 100 the schematic diagram of the circuitry of the preferred embodiment of the present invention telephone monitoring circuitry and apparatus. Circuitry 100 comprise a circuit connector means 110 connected to two input terminals A and B, a first circuit means 120, a second circuit means 130, a third circuit means 140, a fourth circuit means 150 and a circuit power means 160 connected to a power terminal C and a return terminal D. Circuitry 100 may further comprise an optional relay circuit 170.

Circuit connector means 110 comprises two lead wires 112 and 114. There are four colored wires inside a telephone cable. To use the telephone monitoring circuitry and apparatus with a normal dial pulse or touch tone telephone system the red colored ring wire and the green colored tip wire are connected to input terminal A by wire 112 and to input terminal B by wire 114. The red colored ring wire can be connected to either wire 112 or 114 and the green colored tip wire connected to the other wire. Either polarity of the telephone line may occur so either polarity on terminals A and B may occur.

To use the telephone monitoring circuitry and apparatus with a computer telephone system the yellow colored wire and the red colored wire are connected to wire 112 and wire 114. A switch 116 may be used to select the different connections when the telephone monitoring circuitry and apparatus is used with different systems.

First circuit means 120 comprises a single unit bridge assembly formed by four diodes D1, D2, D3 and D4, three resistors R1, R2 and R3, and three capacitors C1, C2 and C3. In the bridge assembly the anode of diode D1 and the cathode of diode D4 are connected together at circuit joint 122, the cathode of diode D1 and the cathode of diode D2 are connected together at circuit joint 124, the anode of diode D2 and the cathode of diode D3 are connected together at circuit joint 126, and the anode of diode D3 and the anode of diode D4 are connected together to return terminal D. Resistor R1 is connected between terminal A and circuit joint 122, resistor R2 is connected between terminal B and circuit joint 126, capacitor C1 is connected between circuit joint 122 and terminal D, capacitor C2 is connected between circuit joint 126 and terminal D, and resister R3 and capacitor C3 are connected in parallel between circuit joint 124 and terminal D. When the telephone line is operative although either polarity on terminals A and B may occur, the four-diode bridge assembly will always produce a positive voltage across resistor R3 with respect to terminal D. This positive voltage is not only independent of the polarity of the voltage on the telephone line but also independent of the existence of a ringing signal and the "on-hook" or "off-hook" condition of the telephone device. This positive voltage will be lost when the telephone line becomes inoperative. Resistor R1 and R2 provide that the input impedance to the telephone monitoring circuitry and apparatus is very large so the values of the input impedance and the input ringer-equivalence are acceptable to the telephone companies. By way of example, resistors R1 and R2 may each be a 5 megohm ¼ watt 5% resistor. Resistor R3 provides a stable voltage reference to circuit joint 124 and also discharges any capacitance at circuit joint 124 when the telephone line is inoperative. Resistor R3 may be a 5 megohm ¼ watt 5% resistor. Capacitors C1, C2 and C3 introduce an approximately 10 second delay. Later capacitors C4 and C5 also contribute to this delay. This delay prevents false alarms that may occur from brief and legitimate changes in the telephone line. Capacitors C1, C2, C3, C4 and C5 may each be a 0.47 microfarad 50 volts capacitor.

The primary function of first circuit means 120 is to always provide a positive voltage to second circuit means 130 at circuit joint 124 when the telephone line is operative. When the telephone line is inoperative the positive voltage is lost.

Second circuit means 130 comprises an operational-amplifier A1, four resistors R4, R5, R6 and R7, and one capacitor C4. Operational-amplifier A1 has eight pins numbered from one to eight. Pin 7 of operational-amplifier A1 is connected to power terminal C and pin 4 of operational-amplifier A1 is connected to terminal D. Resistor R4 is connected between circuit joint 124 in first circuit means 120 and pin 2 of operational-amplifier A1, resistor R5 is connected between pin 3 of operational-amplifier A1 and terminal D, capacitor C4 is connected between pin 2 and pin 3 of operational-amplifier A1, resistor R6 is connected between pin 2 and pin 6 of operational-amplifier A1, and resistor R7 is connected between pin 8 of operational-amplifier A1 and terminal D. The output voltage from first circuit means at circuit joint 124 across resistor R3 is applied in a deferential manner through resistors R4 and R5 to the two input pins pin 2 and pin 3 of operational-amplifier A1. Resistors R4 and R5 may each be a 470 kilohm resistor. Resistor R6 provides a feedback path for operational-amplifier A1 and may be a 10 megohm ¼ watt 5% resistor. When the voltage at pin 2 relative to pin 3 is positive, operational-amplifier A1 will produce a low output voltage at output pin 6. When the positive voltage at pin 2 is lost, operational-amplifier A1 will produce a high output voltage at pin 6. The operational-amplifier A1 may operate at micro-power levels which are defined by resistor R7. Resistor R7 may be a 5 megohm ¼ watt 5% resistor. Capacitor C4 also reduces 60 Hz interference and contributes to the delay and may be a 0.47 microfarad 50 volts capacitor.

The primary function of second circuit means 130 is to provide a low defining voltage to third circuit means 140 at pin 6 of operational-amplifier A1 when the telephone line is operative, and a high defining voltage when the telephone line is inoperative.

Third circuit means 140 comprises two transistors Q1 and Q2, two diodes D5 and D6, six resistors R8, R9, R10, R11, R12 and R13, and one capacitor C5. Resistor R8 is connected between the output pin 6 of operational-amplifier A1 and the base of transistor Q1, resistor R9 is connected between the base of transistor Q1 and terminal D, resistor R10 is connected between terminal C and the collector of transistor Q1, capacitor C5 is connected between the collector of transistor A1 and said terminal D, the emitter of transistor Q1 and the emitter of transistor Q2 are connected together at circuit joint 142, resistor R11 is connected between the collector of transistor Q1 and the base of transistor Q2, resistor R12 is connected between terminal C and the collector of transistor Q2, resistor R13 is connected between terminal C and circuit joint 142, and diodes D5 and D6 are connected in series where the anode of diode D5 is connected to circuit joint 142 and the cathode of diode D6 is connected to terminal D. Transistors Q1 and Q2 are operating as micro-power logic inverters. Resistor R8 limits the current into the base of transistor Q1 and may be a 1 megohm ¼ watt 5% resistor. Resistor R9 provides a defining reference to the base of transistor Q1 and may be a 5 megohm ¼ watt 5% resistor. Resistor R10 operates as a voltage divider for the collector of transistor Q1 and resistor R12 operates as a voltage divider for the collector of transistor Q2. Resistors R10 and R12 may each be a 5 megohm ¼ watt 5% resistor. Resistor R11 limits the current into the base of transistor Q2 and may be a 1 megohm ¼ watt 5% resistor. Capacitor C5 is used to again reduce 60 Hz interference and contribute to the delay and may also be a 0.47 microfarad 50 volt capacitor. Resistor R13 and diodes D5 and D6 are a bias network to level-shift the working point of transistors Q1 and Q2 above the low positive output voltage of operational-amplifier A1 at output pin 6 when the telephone line is operational. When operational amplifier A1 outputs a low voltage at pin 6, transistor Q1 is held in an OFF status thus the voltage at the collector of Q1 is high which in turn holds transistor Q2 in a ON status thus the voltage at the collector of Q2 is very low. When operational amplifier A1 outputs a high voltage at pin 6, transistor Q1 is held in an ON status thus the voltage at the collector of Q1 is low which in turn holds transistor Q2 in a OFF status thus the voltage at the collector of Q2 goes high toward the voltage level of power terminal C.

The primary function of circuit means 140 is to provide a low working voltage to fourth circuit means 150 at the collector of transistor Q2 when the telephone line is operative, and a high working voltage when the telephone line is inoperative.

Fourth circuit means 150 comprises two transistors Q3 and Q4, three resistors R14, R15 and R16, a light emitting diode (LED) 152 and an auditory sounder 154. The base of transistor Q3 is connected to the collector of transistor Q2, the collector of transistor Q3 and the collector of transistor Q4 are connected to terminal C, resistors R14 and R15 are connected in series between the emitter of transistor Q3 and the base of transistor Q4, the anode of LED 152 is connected to the common connecting point of resistors R14 and R15, the cathode of LED 152 is connected to terminal D, and auditory sounder 154 and resistor R16 are connected in parallel between the emitter of Q4 and terminal D. Transistors Q3 and Q4 operate as power amplifiers to energize LED 152 and auditory sounder 154 and may each be an emitter-follower transistor. Resistor R14 limits the current into LED 152 and may be a 330 ohm resistor. Resistor R15 limits the current into the base of transistor Q4 and may be a 22 kilohm resistor. Resistor R16 is a suppressor across auditory sounder 154 and may be a 10 kilohm resistor. The voltage at the base of transistor Q3 is the same voltage output by third circuit means 140 at the collector of transistor Q2. When the voltage at the base of transistor Q3 is low the voltage at the emitter of transistor Q3 and the voltage at the emitter of transistor Q4 are both low therefore LED 152 remains OFF and auditory sounder 154 remains silent. When the voltage at the base of transistor Q3 is high the voltage at the emitter of transistor Q3 goes to a high voltage slightly less than the voltage level of terminal C. This high voltage will energize LED 152 which may be a self-flash type LED. When LED 152 flashes ON the voltage across it drops to a very low level. When LED 152 flashes OFF the voltage across it rises back to about the same voltage as at the emitter of transistor Q3. The flashing of LED 152 provides a visual signal. The voltage across LED 152 is also applied to transistor Q4 through resistor R15 which in turn energizes auditory sounder 154. Due to the rise and fall of the voltage across LED 152 the auditory sounder 154 is modulated louder and softer which provides an audible signal. It is significant that the flashing of LED 152 is used as an up and down signal to modulate auditory sounder 154. This saves the cost of a separate up-down or ON-OFF oscillating circuit or device. Therefore the component count is reduced and the reliability is increased, and the battery drain is reduced substantially.

The primary function of fourth circuit means 150 is to energize light emitting diode 152 and auditory sounder 154 to provide both visual and auditory varying signals when the telephone line is inoperative. When the telephone line is operative, light emitting diode 152 remains OFF and auditory sounder 154 remains silent.

Circuit power means 160 comprises a direct current (DC) voltage power source connected to power terminal C and return terminal D. Circuit power means 160 provides DC power to other circuit means of circuit 100 and may be a nine volt DC battery.

Relay circuit means 170 may be added as an optional part of circuitry 100. Relay circuit means is used to connect fourth circuit means 150 to an external alarm device such as a burglar alarm. Before a burglar breaks in the burglar often cuts the telephone line to abort the dialing out to the police or security company by a silent alarm system. In this category of inoperative telephone line, it is imperative to annunciate the fact either at a remote location or as a loud local sound such as a siren, or both.

Relay circuit means 170 comprises a transistor Q5, a resistor R17 and a relay K1. Resistor R17 is connected between the emitter of transistor Q3 and the base of transistor Q5, relay K1 is connected between terminal C and the collector of transistor Q5, and the emitter of transistor Q5 is connected to terminal D. Resistor R17 limits the current into the base of transistor Q5 and may be a 22 kilohm resistor. Transistor Q5 is operating as a power amplifier to operate relay K1. When the telephone is operative, the voltage at the emitter of transistor Q3 is low which in turn holds transistor Q5 in an OFF status so there is no current through relay K1. When the telephone line is inoperative, the voltage at the emitter of transistor Q3 is high which in turn holds transistor Q5 in an ON status so there is current through K1. This current goes through the coil of relay K1 to energize K1 so that the single-pole single-throw contacts close. Relay K1 contacts are shown in the de-energized or open condition. Relay K1 may be a light duty read delay. It's contacts could control external powerful relays whose contacts in turn control large loads such as sirens, banks of lights, etc. Relays with a multiplicity of contacts may also be used wherein normally closed contacts control other results. One such ancillary result may be a supervisory function associated with an overall security installation.

The primary function of relay circuit means 170 is to provide circuitry 100 the capability of annunciating remotely or controlling remote alarm devices.

Relay circuit means 170 may further comprises a manual switch 172 which may be used to cut off the connection between relay circuit means 170 and fourth circuit means 150. In this way the user of present invention telephone monitoring circuitry and apparatus may arm or disarm the external alarm system depending on the condition.

The present invention telephone monitoring circuitry and apparatus can be used to continuously detect a telephone line used for a normal telephone, an answering machine, a FAX machine or a computer telephone system. It will not activate or alarm when the telephone line is operative. It will not activate or alarm, for example, when a telephone rings for an incoming call or message, or an answering machine answers, or a person answers or makes a call, or a FAX machine or computer answers or makes a call. When the telephone line is cut, broken, shorted or unplugged and becomes inoperative the telephone monitoring circuitry and apparatus will provide both visual and auditory varying signals to help draw attention to the alarm condition. If a user of the telephone monitoring circuitry and apparatus is hard of hearing or deaf, the flashing light emitting diode will be the primary alarm. If the telephone monitoring circuitry and apparatus is out of the view of a user or the user is blind, then the sounding auditory sounder will be the primary alarm.

The present invention telephone monitoring circuitry and apparatus provides many significant advantages, including: (1) both visual and auditory signals; (2) variable alarm signals to draw attention; (3) almost negligible current drawn from the telephone line; (4) acceptable input impedance and ringer-equivalence values to telephone companies; (5) self-isolated design preventing interference with telephone network; (6) about 10 seconds delay from the time the telephone line becomes inoperative and the alarm signals are produced to ignore brief and legitimate interruptions in the telephone line; (7) low components count for increased reliability; and (8) use of a flashing light emitting diode to modulate the auditory sounder thereby eliminating the requirement of a separate flasher circuit. In addition, the telephone monitoring circuitry and apparatus is self-contained and is of small size.

Defined in detail, the present invention is a telephone line monitoring circuitry and apparatus comprising: (a) a circuit connector means for connecting a telephone line to a first input terminal and a second input terminal at another end; (b) a first circuit means having a single unit bridge assembly formed by a first diode, a second diode, a third diode and a fourth diode where the cathode of said first diode and the cathode of said second diode are connected together, the anode of said third diode and the anode of said fourth diode are connected together to a return terminal, the anode of said first diode and the cathode of said fourth diode are connected together, and the anode of said second diode and the cathode of said third diode are connected together, a first resistor which is a 5 megohm ¼ watt 5% resistor connected between said first input terminal and the common connecting point of the anode of said first diode and the cathode of said fourth diode, a second resistor which is a 5 megohm ¼ watt 5% resistor connected between said second input terminal and the common connecting point of the anode of said second diode and the cathode of said third diode, a first capacitor which is a 0.47 microfarad 50 volt capacitor connected between said common connecting point of the anode of said first diode and the cathode of said fourth diode and said return terminal, a second capacitor which is a 0.47 microfarad 50 volt capacitor connected between said common connecting point of the anode of said second diode and the cathode of said third diode and said return terminal, and a third resister which is a 5 megohm ¼ watt 5% resistor and a third capacitor which is a 0.47 microfarad 50 volt capacitor connected in parallel between the common connecting point of the cathode of said first diode and the cathode of said second diode and said return terminal; (c) a second circuit means having an operational-amplifier which operates at micro-power levels and has eight pins numbered from one to eight where pin number seven is connected to a power terminal and pin number four is connected to said return terminal, a fourth resistor which is 470 kilohm resistor connected between said common connecting point of the cathode of said first diode and the cathode of said second diode and pin number two of said operational-amplifier, a fifth resistor which is a 470 kilohm resistor connected between pin number three of said operational-amplifier and said return terminal, a fourth capacitor which is a 0.47 microfarad 50 volt capacitor connected between said pin number two and said pin number three of said operational-amplifier, a sixth resistor which is a 10 megohm ¼ watt 5% resistor connected between said pin number two and pin number six of said operational-amplifier, and a seventh resistor which is a 5 megohm ¼ watt 5% resistor connected between pin number eight of said operational-amplifier and said return terminal; (d) a third circuit means having a first transistor, a second transistor where the emitter of said first transistor and the emitter of said second transistor are connected together, an eighth resistor which is a 1 megohm ¼ watt 5% resistor connected between said pin number six of said operational-amplifier and the base of said first transistor, a ninth resistor which is a 5 megohm ¼ watt 5% resistor connected between the base of said first transistor and said return terminal, a tenth resistor which is a 5 megohm ¼ watt 5% resistor connected between said power terminal and the collector of said first transistor, a fifth capacitor which is a 0.47 microfarad 50 volts capacitor connected between the collector of said first transistor and said return terminal, an eleventh resistor which is a 1 megohm ¼ watt 5% resistor connected between the collector of said first transistor and the base of said second transistor, a twelfth resistor which is a 5 megohm ¼ watt 5% resistor connected between said power terminal and the collector of said second transistor, a thirteenth resistor which is a 5 megohm ¼ watt 5% resistor connected between said power terminal and the common connecting point of the emitter of said first transistor and the emitter of said second transistor, and a fifth diode and a sixth diode connected in series where the anode of said fifth diode is connected to said common connecting point of the emitter of said first transistor and the emitter of said second transistor and the cathode of said sixth diode is connected to said return terminal; (e) a fourth circuit means having a third transistor which is an emitter-follower where the base of said third transistor is connected to the collector of said second transistor and the collector of said third transistor is connected to said power terminal, a fourth transistor which is an emitter-follower where the collector of said fourth transistor is connected to said first power terminal, a fourteenth resistor which is a 330 ohm resister and a fifteenth resister which is a 22 kilohm resister connected in series between the emitter of said third transistor and the base of said fourth transistor, a light emitting diode where the anode of said light emitting diode is connected to the common connecting point of said fourteenth resistor and said fifteenth resistor and the cathode of said light emitting diode is connected to said return terminal, an auditory sounder and a sixteenth resistor which is a 10 kilohm resister connected in parallel between the emitter of said fourth transistor and said return terminal; and (f) a circuit power means having a power source connected to said power terminal and said return terminal; (g) whereby when said circuit connector means is connected to a telephone line, the telephone line monitoring circuitry and apparatus can detect if the telephone line becomes inoperative and cause said light emitting diode to provide a visual signal and said auditory sounder to provide an audible signal if the telephone line becomes inoperative.

Defined broadly, the present invention is a telephone line monitoring circuitry and apparatus comprising: (a) a circuit connector means for connecting a telephone line to a first input terminal and a second input terminal; (b) a first circuit means having a single unit bridge assembly formed by a first diode, a second diode, a third diode and a fourth diode where the cathode of said first diode and the cathode of said second diode are connected together, the anode of said third diode and the anode of said fourth diode are connected together to a return terminal, the anode of said first diode and the cathode of said fourth diode are connected together, and the anode of said second diode and the cathode of said third diode are connected together, a first resistor connected between said first input terminal and the common connecting point of the anode of said first diode and the cathode of said fourth diode, a second resistor connected between said second input terminal and the common connecting point of the anode of said second diode and the cathode of said third diode, a first capacitor connected between said common connecting point of the anode of said first diode and the cathode of said fourth diode and said return terminal, a second capacitor connected between said common connecting point of the anode of said second diode and the cathode of said third diode and said return terminal, and a third resister and a third capacitor connected in parallel between the common connecting point of the cathode of said first diode and the cathode of said second diode and said return terminal; (c) a second circuit means having an operational-amplifier which operates at micro-power levels and has eight pins numbered from one to eight where pin number seven is connected to a power terminal and pin number four is connected to said return terminal, a fourth resistor connected between said common connecting point of the cathode of said first diode and the cathode of said second diode and pin number two of said operational-amplifier, a fifth resistor connected between pin number three of said operational-amplifier and said return terminal, a fourth capacitor connected between said pin number two and said pin number three of said operational-amplifier, a sixth resistor connected between said pin number two and pin number six of said operational-amplifier, and a seventh resistor connected between pin number eight of said operational-amplifier and said return terminal; (d) a third circuit means having a first transistor, a second transistor where the emitter of said first transistor and the emitter of said second transistor are connected together, an eighth resistor connected between said pin number six of said operational-amplifier and the base of said first transistor, a ninth resistor connected between the base of said first transistor and said return terminal, a tenth resistor connected between said power terminal and the collector of said first transistor, a fifth capacitor connected between the collector of said first transistor and said return terminal, an eleventh resistor connected between the collector of said first transistor and the base of said second transistor, a twelfth resistor connected between said power terminal and the collector of said second transistor, a thirteenth resistor connected between said power terminal and the common connecting point of the emitter of said first transistor and the emitter of said second transistor, and a fifth diode and a sixth diode connected in series where the anode of said fifth diode is connected to said common connecting point of the emitter of said first transistor and the emitter of said second transistor and the cathode of said sixth diode is connected to said return terminal; (e) a fourth circuit means having a third transistor which is an emitter-follower where the base of said third transistor is connected to the collector of said second transistor and the collector of said third transistor is connected to said power terminal, a fourth transistor which is an emitter-follower where the collector of said fourth transistor is connected to said first power terminal a fourteenth resistor and a fifteenth resister connected in series between the emitter of said third transistor and the base of said fourth transistor, a light emitting diode where the anode of said light emitting diode is connected to the common connecting point of said fourteenth resistor and said fifteenth resistor and the cathode of said light emitting diode is connected to said return terminal, an auditory sounder and a sixteenth resistor connected in parallel between the emitter of said fourth transistor and said return terminal; and (f) a circuit power means having a power source connected to said power terminal and said return terminal; (g) whereby when said circuit connector means is connected to a telephone line, the telephone line monitoring circuitry and apparatus can detect if the telephone line becomes inoperative and cause said light emitting diode to provide a visual signal and said auditory sounder to provide an audible signal if the telephone line becomes inoperative.

Defined more broadly, the present invention is a telephone line monitoring circuitry and apparatus comprising: (a) a circuit connector means for connecting a telephone line to two input terminals; (b) a first circuit means having a single unit bridge assembly formed by four diodes and a multiplicity of resistors connected to said two input terminals for providing an output voltage which is positive when said telephone line is operative and zero when said telephone line is inoperative; (c) a second circuit means having an operational-amplifier and a multiplicity of resistors connected to said first circuit means for providing a defining voltage which is low when said input voltage is positive and high when said input voltage is zero; (d) a third circuit means having a multiplicity of transistors and a multiplicity of resistors connected to said second circuit means for providing a working voltage which is inadequate when said defining voltage is low and adequate when said defining voltage is high; (e) a fourth circuit means having a multiplicity of transistors, a multiplicity of resistors, a light emitting diode and an auditory sounder connected to said third circuit means where said light emitting diode and said auditory sounder are not energized when said working voltage is inadequate and energized when said working voltage is adequate; and (f) a circuit power means having a power source for providing energy to the circuit components; (g)

whereby when said circuit connector means is connected to a telephone line, the telephone line monitoring circuitry and apparatus can detect if said telephone line becomes inoperative and cause said light emitting diode to provide a visual signal and said auditory sounder to provide an audible signal if the telephone line becomes inoperative.

Defined most broadly, the present invention is a telephone line monitoring circuitry and apparatus comprises: (a) a circuit connector means for connecting a telephone line to a first circuit means; (b) said first circuit means provides an input voltage to a second circuit means where said input voltage is positive when said telephone line is operative and zero when said telephone line is inoperative; (c) said second circuit means provides a defining voltage to a third circuit means where said defining voltage is low when said input voltage is positive and high when said input voltage is zero; (d) said third circuit means provides a working voltage to a fourth circuit means where said working voltage is inadequate when said defining voltage is low and adequate when said defining voltage is high; (e) said fourth circuit means which has a light emitting diode and an auditory sounder where said light emitting diode and said auditory sounder are not energized when said working voltage is inadequate and energized when said working voltage is adequate; and (f) a circuit power means having a power source which provides energy to the circuit components; (g) whereby when said circuit connector means is connected to a telephone line, the telephone line monitoring circuitry and apparatus can detect if said telephone line becomes inoperative and cause said light emitting diode to provide a audible signal if the telephone line becomes inoperative.

Figure 2:
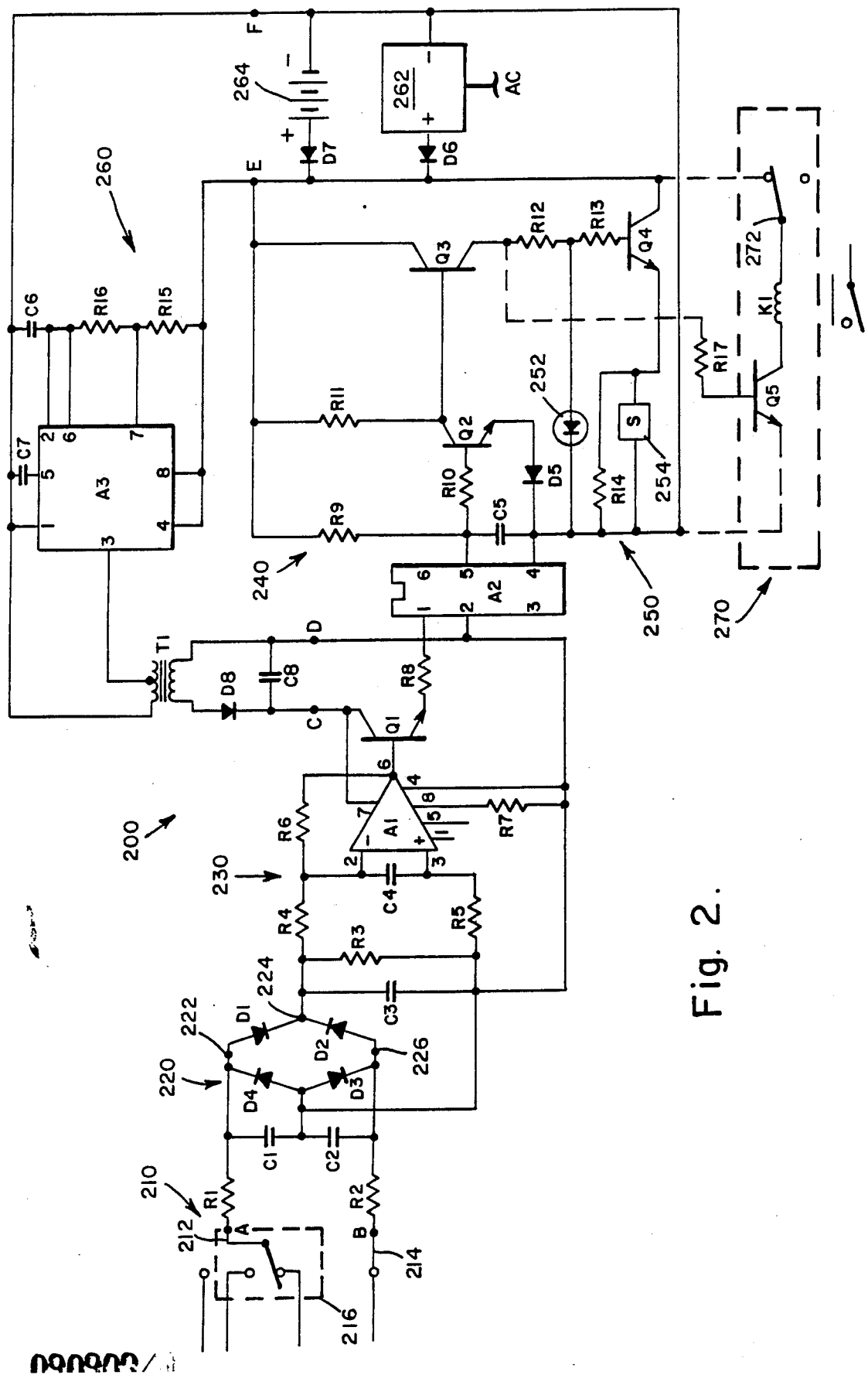
FIG. 2 shows at 200 the schematic diagram of the circuitry of an alternative embodiment of the present invention telephone monitoring circuitry and apparatus. Circuitry 200 comprises a circuit connector means 210, a first circuit means 220, a second circuit means 230, a third circuit means 240, a fourth circuit means 250 and a circuit power means 260. Circuitry 200 may further comprise an optional relay circuit 270.

Referring to FIG. 2, there is shown at 200 an alternative embodiment of the present invention telephone monitoring circuitry and apparatus. Circuitry 200 comprises a circuit connector means 210 connected to two input terminals A and B, a first circuit means 220, a second circuit means 230, a third circuit means 240, a fourth circuit means 250 and a circuit power means 260 connected to a primary power terminal E and a common terminal F. Circuitry 200 may further comprise an optional relay circuit 270.

The alternative embodiment of the present invention allows the telephone monitoring circuitry and apparatus to be used with an alternative current (AC) power source, such as to be directly plugged into a wall outlet of AC voltage source. It further provides complete isolation of the input circuit 220 and 230 from the output circuit 240 and 250 so there is no interference or unbalancing of the telephone network from earth ground or the AC power source.

Circuit connector means 210 comprises two lead wires 12 and 214. There are four colored wires inside a telephone cable. To use the telephone monitoring circuitry and apparatus with a normal dial pulse or touch tone telephone system the red colored ring wire and the green colored tip wire are connected to input terminal A by wire 212 and to input terminal B by wire 214. The red colored ring wire can be connected to either wire 212 or wire 214 and the green colored tip wire connected to the other wire. Either polarity of the telephone line may occur so either polarity on terminals A and B may occur.

To use the telephone monitoring circuitry and apparatus with a computer telephone system the yellow colored wire and the red colored wire are connected to wire 212 and wire 214. A switch 216 may be used to select the different connections when the telephone monitoring circuitry and apparatus is used with different systems.

First circuit means 220 comprises a single unit bridge assembly formed by four diodes D1, D2, D3 and D4, three resistors R1, R2 and R3, and three capacitors C1, C2 and C3. In the bridge assembly the anode of diode D1 and the cathode of diode D4 are connected together at circuit joint 222, the cathode of diode D1 and the cathode of diode D2 are connected together at circuit joint 224, the anode of diode D2 and the cathode of diode D3 are connected together at circuit joint 226, and the anode of diode D3 and the anode of diode D4 are connected together to a return terminal D. Resistor R1 is connected between terminal A and circuit joint 222, resistor R2 is connected between terminal B and circuit joint 226, capacitor C1 is connected between circuit joint 222 and terminal D, capacitor C2 is connected between circuit joint 226 and terminal D, and resister R3 and capacitor C3 are connected in parallel between circuit joint 224 and terminal D. When the telephone line is operative although either polarity on terminals A and B may occur, the four-diode bridge assembly will always produces a positive voltage across resistor R3 with respect to terminal D. This positive voltage is not only independent of the polarity of the voltage on the telephone line but also independent of the existence of a ringing signal and the "on-hook" or "off-hook" condition of the telephone device. This positive voltage will be lost when the telephone line becomes inoperative. Resistors R1 and R2 provide that the input impedance to the telephone monitoring circuitry and apparatus is very large so the values of the input impedance and the input ringer-equivalance are acceptable to the telephone companies. By way of example, resistors R1 and R2 may each be a 5 megohm ¼ watt 5% resistor. Resistor R3 provides a stable voltage reference two circuit joint 224 and also discharges any capacitance at circuit joint 224 when the telephone line is inoperative. Resistor R3 may be a 5 megohm ¼ watt 5% resistor. Capacitors C1, C2 and C3 are used to reduce the interference from the stray 60 Hz AC fields and also introduce an approximately 10 second delay. Later capacitors C4 and C5 also contribute to this delay. This delay prevents false alarms that may occur from brief and legitimate changes in the telephone line. Capacitors C1, C2, C3, C4 and C5 may each be 0.47 microfarad 50 volts capacitor.

The primary function of first circuit means 220 is to always provide a positive voltage to second circuit means 230 at circuit joint 224 when the telephone line is operative. When the telephone line is inoperative the positive voltage is lost.

Second circuit means 230 comprises an operational-amplifier A1, a first transistor Q1, four resistors R4, R5, R6 and R7, and one capacitor C4. Operational-amplifier A1 has eight pins numbered from one to eight. Pin 7 of operational-amplifier A1 is connected to an isolated secondary power terminal C, pin 4 of operational-amplifier A1 is connected to terminal D, and pin 6 of operational-amplifier A1 is connected to the base of transistor Q1. The collector of transistor Q1 is connected to terminal C. Resistor R4 is connected between circuit joint 224 in first circuit means 20 and pin 2 of operational-amplifier A1, resistor R5 is connected between pin 3 of operational-amplifier A1 and terminal D, capacitor C4 is connected between pin 2 and pin 3 of operational-amplifier A1, resistor R6 is connected between pin 2 and pin 6 of operational-amplifier A1, and resistor R7 is connected between pin 8 of operational-amplifier A1 and terminal D. The output voltage from first circuit means at circuit joint 224 across resistor R3 is applied in a differential manner through resistors R4 and R5 to the two input pins pin 2 and pin 3 of operational-amplifier A1. Resistor R4 and resistor R5 may each be a 470 kilohm resistor. Resistor R6 provides a feedback path for operational-amplifier A1 and may be a 10 megohm ¼ watt 5% resistor. When the voltage at pin 2 relative to pin 3 is positive, operational-amplifier A1 will produce a low output voltage at output pin 6. When the positive voltage at pin 2 is lost, operational-amplifier A1 produces a high output voltage at pin 6. Operational-amplifier A1 may operate at micro-power levels which are defined by resistor R7. Resistor R7 may be a 5 megohm ¼ watt 5% resistor. Capacitor C4 also reduces 60 Hz interference and contributes to the delay and may be a 0.47 microfarad 50 volts capacitor. The output voltage at pin 6 of operational-amplifier A1 is power boosted by transistor Q1 which is an emitter-follower transistor.

The primary function of second circuit means 230 is to provide a low defining voltage to third circuit means 240 at the emitter of transistor Q1 when the telephone line is operative, and a high defining voltage when the telephone line is inoperative.

Third circuit means 240 comprises an opto-coupler A2, a transistor Q2, a diode D5, four resistors R8, R9, R10 and R11, and one capacitor C5. Opto-coupler A2 has six pins numbered from one to six where pin 2 is connected to return terminal D and pin 4 is connected to common terminal F. Resistor R8 is connected between the emitter of transistor Q1 and pin 1 of opto-coupler A2, resistor R9 is connected between a primary power terminal E and pin 5 of opto-coupler A2 capacitor C5 is connected between pin 5 of opto-coupler A2 and terminal F, resistor R10 is connected between pin 5 of opto-coupler A2 and the base of transistor Q2, resistor R11 is connected between terminal E and the collector of transistor Q2, the anode of diode D5 is connected to the emitter of transistor Q2 and the cathode of diode D5 is connected to terminal F. Resistor R8 limits the current into pin 1 of opto-coupler A2 and may be a 6.8 kilohm resistor. Resistor R9 operates as a voltage divider for pin 5 of opto-coupler A2 and may be a 100 kilohm resistor. Resistor R10 limits the current into the base of transistor Q2 and may be a 100 kilohm resistor. Resistor R11 operates as a voltage divider for the collector of transistor Q2 and may be a 1 megohm ¼ watt 5% resistor. Capacitor C5 is used to again reduce 60 Hz interference and contribute to the delay and may also be a 0.47 microfarad 50 volt capacitor. Diode D5 is used to set the working point of transistor Q2. Inside opto-coupler A2 there is an inner light emitting diode (LED) connected between pin 1 and pin 2 and a photo-electronic transistor connected between pin 5 and pin 4. When the voltage at the emitter of transistor Q1 is low, the voltage at pin 1 of opto-coupler A2 is also low so the transistor in an OFF status and in turn holds a high voltage at pin 5 of opto-coupler A2. This high voltage through resistor R10 applied at the base of transistor Q2 holds transistor Q2 in an ON status so the voltage at the collector of transistor Q2 is very low. When the voltage at the emitter of transistor Q1 is high, the voltage at pin 1 of opto-coupler A2 is also high so the inner-LED is lit which holds the inner photo-electronic transistor in an ON status and in turn holds a low voltage at pin 5 of opto-coupler A2. This low voltage through resistor R10 applied at the base of transistor Q2 holds transistor Q2 in an OFF status so the voltage at the collector of transistor Q2 goes high toward the voltage level of primary power terminal E.

The primary function of circuit means 240 is to provide a low working voltage to fourth circuit means 250 at the collector of transistor Q2 when the telephone line is operative, and a high working voltage when the telephone line is inoperative.

Fourth circuit means 250 comprises two transistors Q3 and Q4, three resistors R12, R13 and R14, a light emitting diode (LED) 252 and an auditory sounder 254. The base of transistor Q3 is connected to the collector of transistor Q2, the collector of transistor Q3 and the collector of transistor Q4 are connected to terminal E, resistor R14 and R15 are connected in series between the emitter of transistor Q3 and the base of transistor Q4, the anode of LED 252 is connected to the common connecting point of resistors R12 and R13, the cathode of LED 252 is connected to terminal F, and auditory sounder 254 and resistor R14 are connected in parallel between the emitter of Q4 and terminal F. Transistors Q3 and Q4 operate as power amplifiers to energize LED 252 and auditory sounder 254 and may each be an emitter-follower transistor. Resistor R12 limits the current into LED 252 and may be a 330 ohm resistor. Resistor R13 limits the current into the base of transistor Q4 and may be a 22 kilohm resistor. Resistor R14 is a suppressor across auditory sounder 254 and may be a 10 kilohm resistor. The voltage at the base of transistor Q3 is the same voltage output by third circuit means 240 at the collector of transistor Q2. When the voltage at the base of transistor Q3 is low the voltage at the emitter of transistor Q3 and the voltage at the emitter of transistor Q4 are both low therefore LED 252 remains OFF and auditory sounder 254 remains silent. When the voltage at the base of transistor Q3 is high the voltage at the emitter of transistor Q3 goes to a high voltage slightly less than the voltage level of terminal E. This high voltage will energize LED 252 which may be a self-flash type LED. When LED 252 flashes ON the voltage across it drops to a very low level. When LED 252 flashes OFF the voltage across it rises back to about the same voltage as at the emitter of transistor Q3. The flashing of LED 252 provides a visual signal. The voltage across LED 252 is also applied to transistor Q4 through resistor R13 which in turn energizes auditory sounder 254. Due to the rise and fall of the voltage across LED 252 the auditory sounder 254 is modulated louder and softer which provides an auditory signal. It is significant that the flashing of LED 252 is used as an up and down signal to modulate auditory sounder 254. This saves the cost of a separate up-down or ON-OFF oscillating circuit or device. Therefore the components count is reduced and the reliability is increased, and the battery drain is reduced substantially.

The primary function of fourth circuit means 250 is to energize light emitting diode 252 and auditory sounder 254 to provide both visual and auditory varying signals when the telephone line is inoperative. When the telephone line is operative, light emitting diode 252 remains OFF and auditory sounder 254 remains silent.

Circuit power means 260 comprises a first power source 262 and a second power source 264, an oscillator A3, a transformer T1, three diodes D6, D7 and D8, two resistors R15 and R16, and three capacitors C6, C7 and C8. First power source 262 has a positive terminal and a negative terminal The anode of diode D6 is connected to the positive terminal of first power source 262 and the cathode of diode D6 is connected to primary power terminal E. Second power source 264 also has a positive terminal and a negative terminal. The anode of diode D7 is connected to the positive terminal of second power source 264 and the cathode of diode D7 is connected to primary power terminal E. The negative terminals of power source 262 and 264 are connected to common terminal F. Oscillator A3 has eight pins numbered from one to eight where pin 4 and pin 8 are connected together to terminal E, pin 1 is connected to terminal F, and pin 2 and pin 6 are connected together. Resister R15 is connected between pin 8 and pin 7 of oscillator A3. Resistor R16 is connected between pin 7 and pin 6 of oscillator A3. Capacitor C6 is connected between pin 6 of oscillator A3 and terminal F. Capacitor C7 is connected between pin 5 of oscillator A3 and terminal F. Transformer T1 has a primary winding and a secondary winding. The primary winding of transformer T1 is center-tapped. The center-tap of the primary winding of transformer T1 is connected to pin 3 of oscillator A3 and an end of the primary winding of transformer T1 is connected to terminal F. The secondary winding of transformer T1 has a center-tap which is not used. One end of the secondary winding of transformer T1 is connected to return terminal D. The other end of the secondary winding of transformer T1 is connected to the anode of diode D8, and the cathode of diode D8 is connected to isolated secondary power terminal C. Capacitor C8 is connected between secondary power terminal C and return terminal D. First power source 262 is a battery eliminator which outputs direct current (DC) voltage at its positive terminal when connected to an alternating current (AC) power source such as an AC wall outlet. First power source 262 may be a nine volt battery eliminator. Second power source 264 is a DC battery and is used as a back up power source. Second power source may be a nine volt DC battery. Second power source 264 becomes inoperative when first power source 262 is operative, and becomes operative when first power source 262 is inoperative. Resistors R15 and R16 and capacitor C6 are used to set the frequency and balance of oscillator A3. Resistor R15 and R16 may each be a 10 kilohm resistor. Capacitor C6 may be a 0.01 microfarad capacitor. Capacitor C7 is required for oscillator operation and may be a 0.01 microfarad capacitor. The output by oscillator A3 at pin 3 is stepped up by transformer T1 and in turn is rectified by diode D8 and stored by capacitor C8. Capacitor C8 may be a 0.01 microfarad capacitor. The result is an isolated DC applied to secondary power terminal C.

Relay circuit means 270 can be added as an optional part of circuitry 200 to connect fourth circuit means 250 to an external alarm device such as a burglar alarm. Relay circuit means comprises a transistor Q5, a resistor R17 and a relay K1. Resistor R17 is connected between the emitter of transistor Q3 and the base of transistor Q5, relay K1 is connected between terminal E and the collector of transistor Q5, and the emitter of transistor Q5 is connected to terminal F. Resistor R17 limits the current into the base of transistor Q5 and may be a 22 kilohm resistor. Transistor Q5 is operating as a power amplifier to operate relay K1. When the telephone is operative, the voltage at the emitter of transistor Q3 is low which in turn holds transistor Q5 in an OFF status thus there is no current through relay K1. When the telephone line is operative, the voltage at the emitter of transistor Q3 is high which in turn holds transistor Q5 in an ON status thus there is current through K1. This current goes through the coil of relay K1 to energize K1 so that the single-pole single-throw contacts close. Relay K1 contacts are shown in the de-energized or open condition. Relay K1 may be a light duty reed delay.

The primary function of relay circuit means 270 is to provide circuitry 200 with the capability of annunciating remotely or controlling remote alarm devices.

Relay circuit means 270 may further comprises a manual switch 272 which may be used to cut off the connection between relay circuit means 270 and fourth circuit means 250. In this way the user of the present invention telephone monitoring circuitry and apparatus may arm or disarm the external alarm system depending on the condition.

Defined in detail, the alternative embodiment of the present invention is a telephone line monitoring circuitry and apparatus comprising: (a) a circuit connector means for connecting a telephone line to a first input terminal and a second input terminal; (b) a first circuit means having a single unit bridge assembly formed by a first diode, a second diode, a third diode and a fourth diode where the cathode of said first diode and the cathode of said second diode are connected together, the anode of said third diode and the anode of said fourth diode are connected together to a return terminal, the anode of said first diode and the cathode of said fourth diode are connected together, and the anode of said second diode and the cathode of said third diode are connected together, a first resistor which is a 5 megohm ¼ watt 5% resistor connected between said first input terminal and the common connecting point of the anode of said first diode and the cathode of said fourth diode, a second resistor which is a 5 megohm ¼ watt 5% resistor connected between said second input terminal and the common connecting point of the anode of said second diode and the cathode of said third diode, a first capacitor which is a 0.47 microfarad 50 volt capacitor connected between said common connecting point of the anode of said first diode and the cathode of said fourth diode and said return terminal, a second capacitor which is a 0.47 microfarad 50 volt capacitor connected between said common connecting point of the anode of said second diode and the cathode of said third diode and said return terminal, and a third resister which is a 5 megohm ¼ watt 5% resistor and a third capacitor which is a 0.47 microfarad 50 volt capacitor connected in parallel between the common connecting point of the cathode of said first diode and the cathode of said second diode and said return terminal; (c) a second circuit means having an operational-amplifier which operates at micro-power levels and has eight pins numbered from one to eight where pin number seven is connected to an isolated secondary power terminal and pin number four is connected to said return terminal, a first transistor where the base of said first transistor is connected to said pin number six of said operational-amplifier and the collector of said first transistor is connected to said secondary power terminal, a fourth resistor which is a 470 kilohm resistor connected between said common connecting point of the cathode of said first diode and the cathode of said second diode and pin number two of said operational-amplifier a fifth resistor which is a 470 kilohm resistor connected between said pin number three of said operational-amplifier and said return terminal, a fourth capacitor which is a 0.47 microfarad 50 volt capacitor connected between said pin number two and said pin number three of said operational-amplifier, a sixth resistor which is a 10 megohm ¼ watt 5% resistor connected between said pin number two and pin number six of said operational-amplifier, and a seventh resistor which is a 5 megohm ¼ watt 5% resistor connected between pin number eight of said operational-amplifier and said return terminal; (d) a third circuit means having an opto-coupler which has six pins numbered from one to six where pin number two is connected to said return terminal and pin number four is connected to a common terminal, a second transistor, an eighth resistor which is a 6.8 kilohm resistor connected between the emitter of said first transistor and pin number one of said opto-coupler, a ninth resistor which is a 100 kilohm resistor connected between a primary power terminal and pin number five of said opto-coupler, a fifth capacitor which is a 0.47 microfarad 50 volt capacitor connected between said pin number five of said opto-coupler and said common terminal, a tenth resistor which is a 100 kilohm resistor connected between said pin number five of said opto-coupler and the base of said second transistor, an eleventh resistor which is a 1 megohm ¼ watt 5% resistor connected between said primary power terminal and the collector of said second transistor, and a fifth diode where the anode of said fifth diode is connected to the emitter of said second transistor and the cathode of said fifth diode is connected to said common terminal; (e) a fourth circuit means having a third transistor which is an emitter-follower where the base of said third transistor is connected to the collector of said second transistor and the collector of said third transistor is connected to said primary power terminal, a fourth transistor which is an emitter-follower where the collector of said fourth transistor is connected to said primary power terminal, a twelfth resistor which is a 330 ohm resistor and a thirteenth resister which is a 22 kilohm resistor connected in series between the emitter of said third transistor and the base of said fourth transistor, a light emitting diode where the anode of said light emitting diode is connected to the common connecting point of said twelfth resistor and said thirteenth resistor and the cathode of said light emitting diode is connected to said common terminal, an auditory sounder and a fourteenth resistor which is a 10 kilohm resistor connected in parallel between the emitter of said fourth transistor and said common terminal; and (f) a circuit power means having a first power source which has a positive terminal and a negative terminal where the negative terminal is connected to said common terminal, a sixth diode where the anode of said sixth diode is connected to said positive terminal of said first power source and the cathode of said sixth diode is connected to said primary power terminal, a second power source which has a positive terminal and a negative terminal where the negative terminal is connected to said common terminal, a seventh diode where the anode of said seventh diode is connected to said positive terminal of said second power source and the cathode of said seventh diode is connected to said primary power terminal, an oscillator which has eight pins numbered from one to eight where pin number four and pin number eight are connected together to said primary power terminal, pin number one is connected to said common terminal, and pin number two and pin number six are connected together, a fifteenth resistor which is a 10 kilohm resistor connected between said pin number eight and pin number seven of said oscillator, a sixteenth resistor which is a 10 kilohm resistor connected between said pin number seven and said pin number six of said oscillator, a sixth capacitor which is a 0.01 microfarad capacitor connected between said pin number six and said common terminal, a seventh capacitor which is a 0.01 microfarad capacitor connected between pin number five of said oscillator and said common terminal, a transformer which has a primary winding and a secondary winding where said primary winding has a center-tap connected to pin number three of said oscillator and an end connected to said common terminal, and said secondary winding has one end connected to said return terminal, an eighth diode where the anode of said eighth diode is connected to the other end of said secondary winding of said transformer and the cathode of said eighth diode is connected to said secondary power terminal, and an eighth capacitor which is a 0.01 microfarad capacitor connected between said secondary power terminal and said return terminal, where said second power source becomes inoperative when said first power source is operative, and said second power source becomes operative when said first power source is inoperative; (g) whereby when said circuit connector means is connected to a telephone line, the telephone line monitoring circuitry and apparatus can detect if the telephone line becomes inoperative and cause said light emitting diode to provide a visual signal and said auditory sounder to provide an audible signal if the telephone line becomes inoperative.

Defined broadly, the alternative embodiment of the present invention is a telephone line monitoring circuitry and apparatus comprising: (a) a circuit connector means for connecting a telephone line to a first input terminal and a second input terminal; (b) a first circuit means having a single unit bridge assembly formed by a first diode, a second diode, a third diode and a fourth diode where the cathode of said first diode and the cathode of said second diode are connected together, the anode of said third diode and the anode of said fourth diode are connected together to a return terminal, the anode of said first diode and the cathode of said fourth diode are connected together, and the anode of said second diode and the cathode of said third diode are connected together, a first resistor connected between said first input terminal and the common connecting point of the anode of said first diode and the cathode of said fourth diode, a second resistor connected between said second input terminal and the common connecting point of the anode of said second diode and the cathode of said third diode, a first capacitor connected between said common connecting point of the anode of said first diode and the cathode of said fourth diode and said return terminal, a second capacitor connected between said common connecting point of the anode of said second diode and the cathode of said third diode and said return terminal, and a third resister and a third capacitor connected in parallel between the common connecting point of the cathode of said first diode and the cathode of said second diode and said return terminal; (c) a second circuit means having an operational-amplifier which operates at micro-power levels and has eight pins numbered from one to eight where pin number seven is connected to a secondary power terminal and pin number four is connected to said return terminal, a first transistor where the base of said first transistor is connected to said pin number six of said operational-amplifier and the collector of said first transistor is connected to said secondary power terminal, a fourth resistor connected between said common connecting point of the cathode of said first diode and the cathode of said second diode and pin number two of said operational-amplifier, a fifth resistor connected between said pin number three of said operational-amplifier and said return terminal, a fourth capacitor connected between said pin number two and said pin number three of said operational-amplifier, a sixth resistor connected between said pin number two and pin number six of said operational-amplifier, and a seventh resistor connected between pin number eight of said operational-amplifier and said return terminal; (d) a third circuit means having an opto-coupler which has six pins numbered from one to six where pin number two is connected to said return terminal and pin number four is connected to a common terminal, a second transistor, an eiqhth resistor connected between the emitter of said first transistor and pin number one of said opto-coupler, a ninth resistor connected between a primary power terminal and pin number five of said opto-coupler, a fifth capacitor connected between said pin number five of said opto-coupler and said common terminal, a tenth resistor connected between said pin number five of said opto-coupler and the base of said second transistor, an eleventh resistor connected between said primary power terminal and the collector of said second transistor, and a fifth diode where the anode of said fifth diode is connected to the emitter of said second transistor and the cathode of said fifth diode is connected to said common terminal; (e) a fourth circuit means having a third transistor which is an emitter-follower where the base of said third transistor is connected to the collector of said second transistor and the collector of said third transistor is connected to said primary power terminal, a fourth transistor which is an emitter-follower where the collector of said fourth transistor is connected to said primary power terminal, a twelfth resistor and a thirteenth resister connected in series between the emitter of said third transistor and the base of said fourth transistor, a light emitting diode where the anode of said light emitting diode is connected to the common connecting point of said twelfth resistor and said thirteenth resistor and the cathode of said light emitting diode is connected to said common terminal, an auditory sounder and a fourteenth resistor connected in parallel between the emitter of said fourth transistor and said common terminal; and (f) a circuit power means having a first power source which has a positive terminal and a negative terminal where the negative terminal is connected to said common terminal, a sixth diode where the anode of said sixth diode is connected to said positive terminal of said first power source and the cathode of said sixth diode is connected to said primary power terminal, a second power source which has a positive terminal and a negative terminal where the negative terminal is connected to said common terminal, a seventh diode where the anode of said seventh diode is connected to said positive terminal of said second power source and the cathode of said seventh diode is connected to said primary power terminal, an oscillator which has eight pins numbered from one to eight where pin number four and pin number eight are connected together to said primary power terminal, pin number one is connected to said common terminal, and pin number two and pin number six are connected together, a fifteenth resistor connected between said pin number eight and pin number seven of said oscillator, a sixteenth resistor connected between said pin number seven and said pin number six of said oscillator, a sixth capacitor connected between said pin number six and said common terminal, a seventh capacitor connected between pin number five of said oscillator and said common terminal, a transformer which has a primary winding and a secondary winding where said primary winding has a center-tap connected to pin number three of said oscillator and an end connected to said common terminal, and said secondary winding has one end connected to said return terminal, an eighth diode where the anode of said eighth diode is connected to the other end of said secondary winding of said transformer and the cathode of said eighth diode is connected to said secondary power terminal, and an eighth capacitor connected between said secondary power terminal and said return terminal, where said second power source becomes inoperative when said first power source is operative, and said second power source becomes operative when said first power source is inoperative: (g) whereby when said circuit connector means is connected to a telephone line, the telephone line monitoring circuitry and apparatus can detect if the telephone line becomes inoperative and cause said light emitting diode to provide a visual signal and said auditory sounder to provide an audible signal if the telephone line becomes inoperative.

Defined more broadly, the alternative embodiment of the present invention is a telephone line monitoring circuitry and apparatus comprising: (a) a circuit connector means for connecting a telephone line to two input terminals; (b) a first circuit means having a single unit bridge assembly formed by four diodes and a multiplicity of resistors connected to said two input terminals for providing an input voltage which is positive when said telephone line is operative and zero when said telephone line is inoperative; (c) a second circuit means having an operational-amplifier and a multiplicity of resistors connected to said first circuit means for providing a defining voltage which is low when said input voltage is positive and high when said input voltage is zero; (d) a third circuit means having a multiplicity of transistors and a multiplicity of resistors connected to said second circuit means for providing a working voltage which is inadequate when said defining voltage is low and adequate when said defining voltage is high; (e) a fourth circuit means having a multiplicity of transistors, a multiplicity of resistors, a light emitting diode and an auditory sounder connected to said third circuit means where said light emitting diode and said auditory sounder are not energized when said working voltage is inadequate and energized when said working voltage is adequate; and (f) a circuit power means having a first power source and a second power source for providing energy to the circuit components where said second power source becomes inoperative when said first power source is operative, and said second power source becomes operative when said first power source is inoperative; (g) whereby when said circuit connector means is connected to a telephone line, the telephone line monitoring circuitry and apparatus can detect if said telephone line becomes inoperative and cause said light emitting diode to provide a visual signal and said auditory sounder to provide an audible signal if the telephone line becomes inoperative.

Defined most broadly, the alternative embodiment of the present invention is a telephone line monitoring circuitry and apparatus comprising: (a) a circuit connector means for connecting a telephone line to a first circuit means; (b) said first circuit means provides an input voltage to a second circuit means where said input voltage is positive when said telephone line is operative and zero when said telephone line is inoperative; (c) said second circuit means provides a defining voltage to a third circuit means where said defining voltage is low when said input voltage is positive and high when said input voltage is zero; (d) said third circuit means provides a working voltage to a fourth circuit means where said working voltage is inadequate when said defining voltage is low and adequate when said defining voltage is high; (e) said fourth circuit means which has a light emitting diode and an auditory sounder where said light emitting diode and said auditory sounder are not energized when said working voltage is inadequate and energized when said working voltage is adequate; and (f) a circuit power means having a first power source and a second power source to provide energy to the circuit components where said second power source becomes inoperative when said first power source is operative, and said second power source becomes operative when said first power source is inoperative; (g) whereby when said circuit connector means is connected to a telephone line, the telephone line monitoring circuitry and apparatus can detect if said telephone line becomes inoperative and cause said light emitting diode to provide a visual signal and said auditory sounder to provide an audible signal if the telephone line becomes inoperative.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus is intended only for illustration and for disclosure of an operative embodiment and not to show all of the various forms or modification in which the invention might be embodied or operated.

The invention has been described in considerable detail in order to comply with the patent laws by providing full public disclosure of at least one of its forms. However, such detailed description is not intended in any way to limit the broad features or principles of the invention, or the scope of patent monopoly to be granted.

What is claimed is:

1. A telephone line monitoring circuitry and apparatus comprising:
   a. a circuit connector means for connecting a telephone line to a first input terminal and a second input terminal;
   b. a first circuit means having a single unit bridge assembly formed by a first diode, a second diode, a third diode and a fourth diode where the cathode of said first diode and the cathode of said second diode are connected together, the anode of said third diode and the anode of said fourth diode are connected together to a return terminal, the anode of said first diode and the cathode of said fourth diode are connected together, and the anode of said second diode and the cathode of said third diode are connected together, a first resistor connected between said first input terminal and the common connecting point of the anode of said first diode and the cathode of said fourth diode, a second resistor connected between said second input terminal and the common connecting point of the anode of said second diode and the cathode of said third diode, a first capacitor connected between said common connecting point of the anode of said first diode and the cathode of said fourth diode and said return terminal, a second capacitor connected between said common connecting point of the anode of said second diode and the cathode of said third diode and said return terminal, and a third resistor and a third capacitor connected in parallel between the common connecting point of the cathode of said first diode and the cathode of said second diode and said return terminal;
   c. a second circuit means having an operational-amplifier which operates at micro-power levels and has eight pins numbered from one to eight where pin number seven is connected to a power terminal and pin number four is connected to said return terminal, a fourth resistor connected between said common connecting point of the cathode of said first diode and the cathode of said second diode and pin number two of said operational-amplifier, a fifth resistor connected between pin number three of said operational-amplifier and said return terminal, a fourth capacitor connected between said pin number two and said pin number three of said operational-amplifier, a sixth resistor connected between said pin number two and pin number six of said operational-amplifier, and a seventh resistor connected between pin number eight of said operational-amplifier and said return terminal;
   d. a third circuit means having a first transistor, a second transistor where the emitter of said first transistor and the emitter of said second transistor are connected together, an eighth resistor connected between said pin number six of said operational-amplifier and the base of said first transistor, a ninth resistor connected between the base of said first transistor and said return terminal, a tenth resistor connected between said power terminal and the collector of said first transistor, a fifth capacitor connected between the collector of said first transistor and said return terminal, an eleventh resistor connected between the collector of said first transistor and the base of said second transistor, a twelfth resistor connected between said power terminal and the collector of said second transistor, a thirteenth resistor connected between said power terminal and the common connecting point of the emitter of said first transistor and the emitter of said second transistor, and a fifth and a sixth diodes connected in series where the anode of said fifth diode is connected to said common connecting point of the emitter of said first transistor and the emitter of said second transistor and the cathode of said sixth diode is connected to said return terminal;
   e. a fourth circuit means having a third transistor which is an emitter-follower where the base of said third transistor is connected to the collector of said second transistor and the collector of said third transistor is connected to said power terminal, a fourth transistor which is an emitter-follower where the collector of said fourth transistor is connected to said first power terminal, a fourteenth resistor and a fifteenth resister connected in series between the emitter of said third transistor and the base of said fourth transistor, a light emitting diode where the anode of said light emitting diode is connected to the common connecting point of said fourteenth resistor and said fifteenth resistor and the cathode of said light emitting diode is connected to said return terminal, an auditory sounder and a sixteenth resistor connected in parallel between the emitter of said fourth transistor and said return terminal; and f. a circuit power means having a power source connected to said power terminal and said return terminal;

g. whereby when said circuit connector means is connected to a telephone line, the telephone line monitoring circuitry and apparatus can detect if the telephone line becomes inoperative and cause said light emitting diode to provide a visual signal and said auditory sounder to provide an audible signal if the telephone line becomes inoperative.

2. A telephone line monitoring circuitry and apparatus in accordance with claim 1 wherein said circuit connector means further comprises a pair of lead wires connected to a cable which terminates in a telephone plug.

3. A telephone line monitoring circuitry and apparatus in accordance with claim 1 wherein said light emitting diode is a flashing light emitting diode which modulates the signal of said auditory sounder as said light emitting diode flashes on and off.

4. A telephone line monitoring circuitry and apparatus in accordance with claim 1 wherein said power source is a nine volts battery.

5. A telephone line monitoring circuitry and apparatus in accordance with claim 1 further comprising a switching means to select the circuit input into a normal red wire and green wire telephone line or into a computer yellow wire and red wire telephone line.

6. A telephone line monitoring circuitry and apparatus in accordance with claim 1 further comprising:

a. a relay circuit means having a fifth transistor where the emitter of said fifth transistor is connected to said return terminal, a seventeenth resistor connected between the emitter of said third transistor and the base of said fifth transistor, and a relay connected between said power terminal and the collector of said fifth transistor;

b. whereby said relay circuit means connects the telephone line monitoring circuitry and apparatus to an external warning means.

7. A telephone line monitoring circuitry and apparatus comprising:

a. a circuit connector means for connecting a telephone line to a first input terminal and a second input terminal at another end;

b. a first circuit means having a single unit bridge assembly formed by a first diode, a second diode, a third diode and a fourth diode where the cathode of said first diode and the cathode of said second diode are connected together, the anode of said third diode and the anode of said fourth diode are connected together to a return terminal, the anode of said first diode and the cathode of said fourth diode are connected together, and the anode of said second diode and the cathode of said third diode are connected together, a first resistor which is a 5 megohm ¼ watt 5% resistor connected between said first input terminal and the common connecting point of the anode of said first diode and the cathode of said fourth diode, a second resistor which is a 5 megohm ¼ watt 5% resistor connected between said second input terminal and the common connecting point of the anode of said second diode and the cathode of said third diode, a first capacitor which is a 0.47 microfarad 50 volt capacitor connected between said common connecting point of the anode of said first diode and the cathode of said fourth diode and said return terminal, a second capacitor which is a 0.47 microfarad 50 volt capacitor connected between said common connecting point of the anode of said second diode and the cathode of said third diode and said return terminal, and a third resister which is a 5 megohm ¼ watt 5% resistor and a third capacitor which is a 0.47 microfarad 50 volt capacitor connected in parallel between the common connecting point of the cathode of said first diode and the cathode of said second diode and said return terminal;

c. a second circuit means having an operational-amplifier which operates at micro-power levels and has eight pins numbered from one to eight where pin number seven is connected to a power terminal and pin number four is connected to said return terminal, a fourth resistor which is 470 kilohm resistor connected between said common connecting point of the cathode of said first diode and the cathode of said second diode and pin number two of said operational-amplifier, a fifth resistor which is a 470 kilohm resistor connected between pin number three of said operational-amplifier and said return terminal, a fourth capacitor which is a 0.47 microfarad 50 volts capacitor connected between said pin number two and said pin number three of said operational-amplifier, a sixth resistor which is a 10 megohm ¼ watt 5% resistor connected between said pin number two and pin number six of said operational-amplifier, and a seventh resistor which is a 5 megohm ¼ watt 5% resistor connected between pin number eight of said operational-amplifier and said return terminal;

d. a third circuit means having a first transistor, a second transistor where the emitter of said first transistor and the emitter of said second transistor are connected together, an eighth resistor which is a 1 megohm ¼ watt 5% resistor connected between said pin number six of said operational-amplifier and the base of said first transistor, a ninth resistor which is a 5 megohm ¼ watt 5% resistor connected between the base of said first transistor and said return terminal, a tenth resistor which is a 5 megohm ¼ watt 5% resistor connected between said power terminal and the collector of said first transistor, a fifth capacitor which is a 0.47 microfarad 50 volts capacitor connected between the collector of said first transistor and said return terminal, an eleventh resistor which is a 1 megohm ¼ watt 5% resistor connected between the collector of said first transistor and the base of said second transistor, a twelfth resistor which is a 5 megohm ¼ watt 5% resistor connected between said power terminal and the collector of said second transistor, a thirteenth resistor which is a 5 megohm ¼ watt 5% resistor connected between said power terminal and the common connecting point of the emitter of said first transistor and the emitter of said second transistor, and a fifth diode and a sixth diode connected in series where the anode of said fifth diode is connected to said common connecting point of the emitter of said first transistor and the emitter of said second transistor and the cathode of said sixth diode is connected to said return terminal;

e. a fourth circuit means having a third transistor which is an emitter-follower where the base of said third transistor is connected to the collector of said second transistor and the collector of said third transistor is connected to said power terminal, a fourth transistor which is an emitter-follower where the collector of said fourth transistor is connected to said first power terminal, a fourteenth resistor which is a 330 ohm resister and a fifteenth resister which is a 22 kilohm resister connected in series between the emitter of said third transistor and the base of said fourth transistor, a light emitting diode where the anode of said light emitting diode is connected to the common connecting point of said fourteenth resistor and said fifteenth resistor and the cathode of said light emitting diode is connected to said return terminal, an auditory sounder and a sixteenth resistor which is a 10 kilohm resister connected in parallel between the emitter of said fourth transistor and said return terminal; and f. a circuit power means having a power source connected to said power terminal and said return terminal;

g. whereby when said circuit connector means is connected to a telephone line, the telephone line monitoring circuitry and apparatus can detect if the telephone line becomes inoperative and cause said light emitting diode to provide a visual signal and said auditory sounder to provide an audible signal if the telephone line becomes inoperative.

8. A telephone line monitoring circuitry and apparatus in accordance with claim 7 wherein said circuit connector means further comprises a pair of lead wires connected to a cable which terminates in a telephone plug.

9. A telephone line monitoring circuitry and apparatus in accordance with claim 7 wherein said light emitting diode is a flashing light emitting diode which modulates the signal of said auditory sounder as said light emitting diode flashes on and off.

10. A telephone line monitoring circuitry and apparatus in accordance with claim 7 wherein said power source is a nine volt battery.

11. A telephone line monitoring circuitry and apparatus in accordance with claim 7 further comprising a switching means to select the circuit input into a normal red and green wire telephone line or into a computer yellow and red wire telephone line.

12. A telephone line monitoring circuitry and apparatus in accordance with claim 7 further comprising:

a. a relay circuit means having a fifth transistor where the emitter of said fifth transistor is connected to said return terminal, a seventeenth resistor which is a 22 kilohm resistor connected between the emitter of said third transistor and the base of said fifth transistor, and a relay connected between said power terminal and the collector of said fifth transistor;

b. whereby said relay circuit means connects the telephone line monitoring circuitry and apparatus to an external warning means.

13. A telephone line monitoring circuitry and apparatus comprising:

a. a circuit connector means for connecting a telephone line to two input terminals;

b. a first circuit means having a single unit bridge assembly formed by four diodes and a multiplicity of resistors connected to said two input terminals for providing an input voltage which is positive when said telephone line is operative and zero when said telephone line is inoperative;

c. a second circuit means having an operational-amplifier and a multiplicity of resistors connected to said first circuit means for providing a defining voltage which is low when said input voltage is positive and high when said input voltage is zero;

d. a third circuit means having a multiplicity of transistors and a multiplicity of resistors connected to said second circuit means for providing a working voltage which is inadequate when said defining voltage is low and adequate when said defining voltage is high;

e. a fourth circuit means having a multiplicity of transistors, a multiplicity of resistors, a light emitting diode and an auditory sounder connected to said third circuit means where said light emitting diode and said auditory sounder are not energized when said working voltage is inadequate and energized when said working voltage is adequate; and f. a circuit power means having a power source for providing energy to the circuit components;

g. whereby when said circuit connector means is connected to a telephone line, the telephone line monitoring circuitry and apparatus can detect if said telephone line becomes inoperative and cause said light emitting diode to provide a visual signal and said auditory sounder to provide an audible signal if the telephone line becomes inoperative.

14. A telephone line monitoring circuitry and apparatus in accordance with claim 13 wherein said circuit connector means further comprises a pair of lead wires connected to a cable which terminates in a telephone plug.

15. A telephone line monitoring circuitry and apparatus in accordance with claim 13 wherein said light emitting diode is a flashing light emitting diode which modulates the signal of said auditory sounder as said light emitting diode flashes on and off.

16. A telephone line monitoring circuitry and apparatus in accordance with claim 13 wherein said power source is a nine volt battery.

17. A telephone line monitoring circuitry and apparatus in accordance with claim 13 further comprising a switching means to select the circuit input into a normal red wire and green wire telephone line or into a computer yellow wire and red wire telephone line.

18. A telephone line monitoring circuitry and apparatus comprising:

a. a circuit connector means for connecting a telephone line to a first circuit means;

b. said first circuit means provides an input voltage to a second circuit means where said input voltage is positive when said telephone line is operative and zero when said telephone line is inoperative;

c. said second circuit means provides a defining voltage to a third circuit means where said defining voltage is low when said input voltage is positive and high when said input voltage is zero;

d. said third circuit means provides a working voltage to a fourth circuit means where said working voltage is inadequate when said defining voltage is low and adequate when said defining voltage is high;

e. said fourth circuit means which has a light emitting diode and an auditory sounder where said light emitting diode and said auditory sounder are not energized when said working voltage is inadequate and energized when said working voltage is adequate; and f. a circuit power means having a power source which provides energy to the circuit components;

g. whereby when said circuit connector means is connected to a telephone line, the telephone line monitoring circuitry and apparatus can detect if said telephone line becomes inoperative and cause said light emitting diode to provide a visual signal and said auditory sounder to provide an audible signal if the telephone line becomes inoperative.

19. A telephone line monitoring circuitry and apparatus in accordance with claim 18 wherein said second circuit means comprises an operational-amplifier which operates at micro-power levels.

20. A telephone line monitoring circuitry and apparatus in accordance with claim 18 wherein said power source is a nine volt battery.

21. A telephone line monitoring circuitry and apparatus comprising:

a. a circuit connector means for connecting a telephone line to a first input terminal and a second input terminal;

b. a first circuit means having a single unit bridge assembly formed by a first diode, a second diode, a third diode and a fourth diode where the cathode of said first diode and the cathode of said second diode are connected together, the anode of said third diode and the anode of said fourth diode are connected together to a return terminal, the anode of said first diode and the cathode of said fourth diode are connected together, and the anode of said second diode and the cathode of said third diode are connected together, a first resistor connected between said first input terminal and the common connecting point of the anode of said first diode and the cathode of said fourth diode, a second resistor connected between said second input terminal and the common connecting point of the anode of said second diode and the cathode of said third diode, a first capacitor connected between said common connecting point of the anode of said first diode and the cathode of said fourth diode and said return terminal, a second capacitor connected between said common connecting point of the anode of said second diode and the cathode of said third diode and said return terminal, and a third resistor and a third capacitor connected in parallel between the common connecting point of the cathode of said first diode and the cathode of said second diode and said return terminal;

c. a second circuit means having an operational-amplifier which operates at micro-power levels and has eight pin numbered from one to eight where pin number seven is connected to a secondary power terminal and pin number four is connected to said return terminal, a first transistor where the base of said first transistor is connected to said pin number six of said operational-amplifier and the collector of said first transistor is connected to said secondary power terminal, a fourth resistor connected between said common connecting point of the cathode of said first diode and the cathode of said second diode and pin number two of said operational-amplifier, a fifth resistor connected between said pin number three of said operational-amplifier and said return terminal, a fourth capacitor connected between said pin number two and said pin number three of said operational-amplifier, a sixth resistor connected between said pin number two and pin number six of said operational-amplifier, and a seventh resistor connected between pin number eight of said operational-amplifier and said return terminal;

d. a third circuit means having an opto-coupler which has six pins numbered from one to six where pin number two is connected to said return terminal and pin number four is connected to a common terminal, a second transistor, an eighth resistor connected between the emitter of said first transistor and pin number one of said opto-coupler, a ninth resistor connected between a primary power terminal and pin number five of said opto-coupler, a fifth capacitor connected between said pin number five of said opto-coupler and said common terminal, a tenth resistor connected between said pin number five of said opto-coupler and the base of said second transistor, an eleventh resistor connected between said primary power terminal and the collector of said second transistor, and a fifth diode where the anode of said fifth diode is connected to the emitter of said second transistor and the cathode of said fifth diode is connected to said common terminal;

e. a fourth circuit means having a third transistor which is an emitter-follower where the base of said third transistor is connected to the collector of said second transistor and the collector of said third transistor is connected to said primary power terminal, a fourth transistor which is an emitter-follower where the collector of said fourth transistor is connected to said primary power terminal, a twelfth resistor and a thirteenth resister connected in series between the emitter of said third transistor and the base of said fourth transistor, a light emitting diode where the anode of said light emitting diode is connected to the common connecting point of said twelfth resistor and said thirteenth resistor and the cathode of said light emitting diode is connected to said common terminal, an auditory sounder and a fourteenth resistor connected in parallel between the emitter of said fourth transistor and said common terminal; and f. a circuit power means having a first power source which has a positive terminal and a negative terminal where the negative terminal is connected to said common terminal, a sixth diode where the anode of said sixth diode is connected to said positive terminal of said first power source and the cathode of said sixth diode is connected to said primary power terminal, a second power source which has a positive terminal and a negative terminal where the negative terminal is connected to said common terminal, a seventh diode where the anode of said seventh diode is connected to said positive terminal of said second power source and the cathode of said seventh diode is connected to said primary power terminal, an oscillator which has eight pins numbered from one to eight where pin number four and pin number eight are connected together to said primary power terminal, pin number one is connected to said common terminal, and pin number two and pin number six are connected together, a fifteenth resistor connected between said pin number eight and pin number seven of said oscillator, a sixteenth resistor connected between said pin number seven and said pin number six of said oscillator, a sixth capacitor connected between said pin number six and said common terminal, a seventh capacitor connected between pin number five of said oscillator and said common terminal, a transformer which has a primary winding and a secondary winding where said primary winding has a center-tap connected to pin number three of said oscillator and an end connected to said common terminal, and said secondary winding has one end connected to said return terminal, an eighth diode where the anode of said eighth diode is connected to the other end of said secondary winding of said transformer and the cathode of said eighth diode is connected to said secondary power terminal, and an eighth capacitor connected between said secondary power terminal and said return terminal, where said second power source becomes inoperative when said first power source is operative, and said second power source becomes operative when said first power source is inoperative;

g. whereby when said circuit connector means is connected to a telephone line, the telephone line monitoring circuitry and apparatus can detect if the telephone line becomes inoperative and cause said light emitting diode to provide a visual signal and said auditory sounder to provide an audible signal if the telephone line becomes inoperative.

22. A telephone line monitoring circuitry and apparatus in accordance with claim 21 wherein said circuit connector means further comprises a pair of lead wires connected to a cable which terminates in a telephone plug.

23. A telephone line monitoring circuitry and apparatus in accordance with claim 22 wherein said light emitting diode is a flashing light emitting diode which modulates the signal of said auditory sounder as said light emitting diode flashes on and off.

24. A telephone line monitoring circuitry and apparatus in accordance with claim 21 wherein said first power source is a nine volt battery eliminator which outputs nine volt direct current (DC) voltage at said positive terminal of said first power source when connected to an alternate current (AC) power source outlet.

25. A telephone line monitoring circuitry and apparatus in accordance with claim 21 wherein said second power source is a nine volt battery.

26. A telephone line monitoring circuitry and apparatus in accordance with claim 21 further comprising a switching means to select the circuit input into a normal red wire and green wire telephone line or into a computer yellow wire and red wire telephone line.

27. A telephone line monitoring circuitry and apparatus in accordance with claim 21 further comprising:

a. a relay circuit means having a fifth transistor where the emitter of said fifth transistor is connected to said common terminal, a seventeenth resistor connected between the emitter of said third transistor and the base of said fifth transistor, and a relay connected between said primary power terminal and the collector of said fifth transistor;

b. whereby said relay circuit means connects the telephone line monitoring circuitry and apparatus to an external warning means.

28. A telephone line monitoring circuitry and apparatus comprising:

a. a circuit connector means for connecting a telephone line to a first input terminal and a second input terminal;

b. a first circuit means having a single unit bridge assembly formed by a first diode, a second diode, a third diode and a fourth diode where the cathode of said first diode and the cathode of said second diode are connected together, the anode of said third diode and the anode of said fourth diode are connected together to a return terminal, the anode of said first diode and the cathode of said fourth diode are connected together, and the anode of said second diode and the cathode of said third diode are connected together, a first resistor which is a 5 megohm ¼ watt 5% resistor connected between said first input terminal and the common connecting point of the anode of said first diode and the cathode of said fourth diode, a second resistor which is a 5 megohm ¼ watt 5% resistor connected between said second input terminal and the common connecting point of the anode of said second diode and the cathode of said third diode, a first capacitor which is a 0.47 microfarad 50 volt capacitor connected between said common connecting point of the anode of said first diode and the cathode of said fourth diode and said return terminal, a second capacitor which is a 0.47 microfarad 50 volt capacitor connected between said common connecting point of the anode of said second diode and the cathode of said third diode and said return terminal, and a third resister which is a 5 megohm ¼ watt 5% resistor and a third capacitor which is a 0.47 microfarad 50 volt capacitor connected in parallel between the common connecting point of the cathode of said first diode and the cathode of said second diode and said return terminal;

c. a second circuit means having an operational-amplifier which operates at micro-power levels and has eight pin numbered from one to eight where pin number seven is connected to a secondary power terminal and pin number four is connected to said return terminal, a first transistor where the base of said first transistor is connected to said pin number six of said operational-amplifier and the collector of said first transistor is connected to said secondary power terminal, a fourth resistor which is a 470 kilohm resistor connected between said common connecting point of the cathode of said first diode and the cathode of said second diode and pin number two of said operational-amplifier, a fifth resistor which is a 470 kilohm resistor connected between said pin number three of said operational-amplifier and said return terminal, a fourth capacitor which is a 0.47 microfarad 50 volt capacitor connected between said pin number two and said pin number three of said operational-amplifier, a sixth resistor which is a 10 megohm ¼ watt 5% resistor connected between said pin number two and pin number six of said operational-amplifier, and a seventh resistor which is a 5 megohm ¼ watt 5% resistor connected between pin number eight of said operational-amplifier and said return terminal;

d. a third circuit means having an opto-coupler which has six pins numbered from one to six where pin number two is connected to said return terminal and pin number four is connected to a common terminal, a second transistor, an eighth resistor which is a 6.8 kilohm resistor connected between the emitter of said first transistor and pin number one of said opto-coupler, a ninth resistor which is a 100 kilohm resistor connected between a primary power terminal and pin number five of said opto-coupler, a fifth capacitor which is a 0.47 microfarad 50 volt capacitor connected between said pin number five of said opto-coupler and said common terminal, a tenth resistor which is a 100 kilohm resistor connected between said pin number five of said opto-coupler and the base of said second transistor, an eleventh resistor which is a 1 megohm ¼ watt 5% resistor connected between said primary power terminal and the collector of said second transistor, and a fifth diode where the anode of said fifth diode is connected to the emitter of said second transistor and the cathode of said fifth diode is connected to said common terminal;

e. a fourth circuit means having a third transistor which is an emitter-follower where the base of said third transistor is connected to the collector of said second transistor and the collector of said third transistor is connected to said primary power terminal, a fourth transistor which is an emitter-follower where the collector of said fourth transistor is connected to said primary power terminal, a twelfth resistor which is a 330 ohm resistor and a thirteenth resister which is a 22 kilohm resistor connected in series between the emitter of said third transistor and the base of said fourth transistor, a light emitting diode where the anode of said light emitting diode is connected to the common connecting point of said twelfth resistor and said thirteenth resistor and the cathode of said light emitting diode is connected to said common terminal, an auditory sounder and a fourteenth resistor which is a 10 kilohm resistor connected in parallel between the emitter of said fourth transistor and said common terminal; and f. a circuit power means having a first power source which has a positive terminal and a negative terminal where the negative terminal is connected to said common terminal, a sixth diode where the anode of said sixth diode is connected to said positive terminal of said first power source and the cathode of said sixth diode is connected to said primary power terminal, a second power source which has a positive terminal and a negative terminal where the negative terminal is connected to said common terminal, a seventh diode where the anode of said seventh diode is connected to said positive terminal of said second power source and the cathode of said seventh diode is connected to said primary power terminal, an oscillator which has eight pins numbered from one to eight where pin number four and pin number eight are connected together to said primary power terminal, pin number one is connected to said common terminal, and pin number two and pin number six are connected together, a fifteenth resistor which is a 10 kilohm resistor connected between said pin number eight and pin number seven of said oscillator, a sixteenth resistor which is a 10 kilohm resistor connected between said pin number seven and said pin number six of said oscillator, a sixth capacitor which is a 0.01 microfarad capacitor connected between said pin number six and said common terminal, a seventh capacitor which is a 0.01 microfarad capacitor connected between pin number five of said oscillator and said common terminal, a transformer which has a primary winding and a secondary winding where said primary winding has a center-tap connected to pin number three of said oscillator and an end connected to said common terminal, and said secondary winding has one end connected to said return terminal, an eighth diode where the anode of said eighth diode is connected to the other end of said secondary winding of said transformer and the cathode of said eighth diode is connected to said secondary power terminal, and an eighth capacitor which is a 0.01 microfarad capacitor connected between said secondary power terminal and said return terminal, where said second power source becomes inoperative when said first power source is operative, and said second power source becomes operative when said first power source is inoperative;

g. whereby when said circuit connector means is connected to a telephone line, the telephone line monitoring circuitry and apparatus can detect if the telephone line becomes inoperative and cause said light emitting diode to provide a visual signal and said auditory sounder to provide an audible signal if the telephone line becomes inoperative.

29. A telephone line monitoring circuitry and apparatus in accordance with claim 28 wherein said circuit connector means further comprises a pair of lead wires connected to a cable which terminates in a telephone plug.

30. A telephone line monitoring circuitry and apparatus in accordance with claim 28 wherein said light emitting diode is a flashing light emitting diode which modulates the signal of said auditory sounder as said light emitting diode flashes on and off.

31. A telephone line monitoring circuitry and apparatus in accordance with claim 28 wherein said first power source is a nine volts battery eliminator which outputs nine volts direct current (DC) voltage at said positive terminal of said first power source when connected to an alternate current (AC) power source outlet.

32. A telephone line monitoring circuitry and apparatus in accordance with claim 28 wherein said second power source is a nine volt battery.

33. A telephone line monitoring circuitry and apparatus in accordance with claim 28 further comprising a switching means to select the circuit input into a normal red wire and green wire telephone line or into a computer yellow wire and red wire telephone line.

34. A telephone line monitoring circuitry and apparatus in accordance with claim 28 further comprising:

a. a relay circuit means having a fifth transistor where the emitter of said fifth transistor is connected to said common terminal, a seventeenth resistor which is a 22 kilohm resistor connected between the emitter of said third transistor and the base of said fifth transistor, and a relay connected between said primary power terminal and the collector of said fifth transistor;

b. whereby said relay circuit means connects the telephone line monitoring circuitry and apparatus to an external warning means.

35. A telephone line monitoring circuitry and apparatus comprising:

a. a circuit connector means for connecting a telephone line to two input terminals;

b. a first circuit means having a single unit bridge assembly formed by four diodes and a multiplicity of resistors connected to said two input terminals for providing an input voltage which is positive when said telephone line is operative and zero when said telephone line is inoperative;

c. a second circuit means having an operational-amplifier and a multiplicity of resistors connected to said first circuit means for providing a defining voltage which is low when said input voltage is positive and high when said input voltage is zero;

d. a third circuit means having a multiplicity of transistors and a multiplicity of resistors connected to said second circuit means for providing a working voltage which is inadequate when said defining voltage is low and adequate when said defining voltage is high;

e. a fourth circuit means having a multiplicity of transistors, a multiplicity of resistors, a light emitting diode and an auditory sounder connected to said third circuit means where said light emitting diode and said auditory sounder are not energized when said working voltage is inadequate and energized when said working voltage is adequate; and f. a circuit power means having a first power source and a second power source for providing energy to the circuit components where said second power source becomes inoperative when said first power source is operative, and said second power source becomes operative when said first power source is inoperative;

g. whereby when said circuit connector means is connected to a telephone line, the telephone line monitoring circuitry and apparatus can detect if said telephone line becomes inoperative and cause said light emitting diode to provide a visual signal and said auditory sounder to provide an audible signal if the telephone line becomes inoperative.

36. A telephone line monitoring circuitry and apparatus in accordance with claim 35 wherein said circuit connector means further comprises a pair of lead wires connected to a cable which terminates in a telephone plug.

37. A telephone line monitoring circuitry and apparatus in accordance with claim 35 wherein said light emitting diode is a flashing light emitting diode which modulates the signal of said auditory sounder as said light emitting diode flashes on and off.

38. A telephone line monitoring circuitry and apparatus in accordance with claim 35 wherein said first power source is a nine volt battery eliminator which outputs nine volts direct current (DC) voltage at said positive terminal of said first power source when connected to an alternate current (AC) power source outlet.

39. A telephone line monitoring circuitry and apparatus in accordance with claim 35 wherein said second power source is a nine volts battery.

40. A telephone line monitoring circuitry and apparatus in accordance with claim 35 further comprising a switching means to select the circuit input into a normal red wire and green wire telephone line or into a computer yellow wire and red wire telephone line.

41. A telephone line monitoring circuitry and apparatus comprising:

a. a circuit connector means for connecting a telephone line to a first circuit means;

b. said first circuit means provides an input voltage to a second circuit means where said input voltage is positive when said telephone line is operative and zero when said telephone line is inoperative;

c. said second circuit means provides a defining voltage to a third circuit means where said defining voltage is low when said input voltage is positive and high when said input voltage is zero;

d. said third circuit means provides a working voltage to a fourth circuit means where said working voltage is inadequate when said defining voltage is low and adequate when said defining voltage is high;

e. said fourth circuit means which has a light emitting diode and an auditory sounder where said light emitting diode and said auditory sounder are not energized when said working voltage is inadequate and energized when said working voltage is adequate; and f. a circuit power means having a first power source and a second power source to provide energy to the circuit components where said second power source becomes inoperative when said first power source is operative, and said second power source becomes operative when said first power source is inoperative;

g. whereby when said circuit connector means is connected to a telephone line, the telephone line monitoring circuitry and apparatus can detect if said telephone line becomes inoperative and cause said light emitting diode to provide a visual signal and said auditory sounder to provide an audible signal if the telephone line becomes inoperative.

42. A telephone line monitoring circuitry and apparatus in accordance with claim 41 wherein said second circuit means comprises an operational-amplifier which operates at micro-power levels.

43. A telephone line monitoring circuitry and apparatus in accordance with claim 41 wherein said first power source is a nine volt battery eliminator which outputs nine volt direct current (DC) voltage at said positive terminal of said first power source when connected to an alternate current (AC) power source outlet.

44. A telephone line monitoring circuitry and apparatus in accordance with claim 41 wherein said second power source is a nine volt battery.

* * * * *